United States Patent
Lee et al.

(10) Patent No.: US 9,918,182 B2
(45) Date of Patent: Mar. 13, 2018

(54) MOBILE DEVICE AND METHOD OF INFORMATION TRANSMISSION

(71) Applicant: Intel Corporation, Santa Clara, CA (US)

(72) Inventors: Anthony Lee, San Diego, CA (US); Guotong Wang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/641,594

(22) Filed: Mar. 9, 2015

(65) Prior Publication Data

US 2015/0264633 A1 Sep. 17, 2015

(30) Foreign Application Priority Data

Mar. 12, 2014 (CN) .......................... 2014 1 0089909
Feb. 16, 2015 (CN) .......................... 2015 1 0083778

(51) Int. Cl.
*H04W 4/00* (2009.01)
*H04W 8/24* (2009.01)
*H04W 60/00* (2009.01)

(52) U.S. Cl.
CPC ............ *H04W 4/005* (2013.01); *H04W 8/24* (2013.01); *H04W 60/00* (2013.01)

(58) Field of Classification Search
CPC ..... H04W 60/00; H04W 60/04; H04W 4/005; H04W 88/02; H04W 8/22; H04W 8/24
USPC ....................................... 455/435.1
See application file for complete search history.

(56) References Cited

U.S. PATENT DOCUMENTS

| | | | |
|---|---|---|---|
| 2010/0216465 A1* | 8/2010 | Mubarek ............... | H04W 48/18 455/435.1 |
| 2012/0113938 A1* | 5/2012 | Larsson .............. | H04W 74/008 370/329 |
| 2013/0250827 A1* | 9/2013 | Patwardhan ............ | H04W 8/24 370/311 |

* cited by examiner

Primary Examiner — Magdi Elhag
(74) Attorney, Agent, or Firm — Schiff Hardin LLP

(57) ABSTRACT

A mobile device and information transmission method are provided. The information transmission method is applied to the mobile device in M2M communication and includes the steps of determining whether a base station and the mobile device support transmission of capability information of the mobile device by a General Extension Message and determining whether the mobile device has transmitted the capability information to the base station when the base station and the mobile device support transmission of the capability information by the General Extension Message, wherein when the mobile device has transmitted the capability information to the base station, the capability information is not transmitted by the General Extension Message again.

16 Claims, 3 Drawing Sheets ically relates to the message transmission technology, and more particularly, to the technology for transmitting the capability information of a mobile device via Machine To Machine (M2M) communication.

MOBILE DEVICE AND METHOD OF INFORMATION TRANSMISSION

CROSS REFERENCE TO RELATED APPLICATIONS

This Application claims priority of China Patent Application No. 201410089909.9 filed on Mar. 12, 2014 and China Patent Application No. 201510083778.8 filed on Feb. 16, 2015, the entireties of which are incorporated by reference herein.

BACKGROUND OF THE INVENTION

Field of the Invention

The invention generally relates to the message transmission technology, and more particularly, to the technology for transmitting the capability information of a mobile device via Machine To Machine (M2M) communication.

Description of the Related Art

Wireless communication systems are widely deployed to provide various telecommunication services such as telephony, video, data, messaging, and broadcast. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In addition, as the population of the communication technology, in the Machine To Machine (M2M) communication, the devices can transmit messages with each other through the communication technologies, such as Global System for Mobile Communications (GSM), General Packet Radio Services (GPRS), Universal Mobile Telecommunications System (UMTS), Code Division Multiple Access 2000 (CDMA 2000), 1× High Rate Packet Data (1×HRPD), Long Term Evolution (LTE), etc., to achieve more efficient communication services.

In the CDMA 2000 system referring to Evolution-Data Optimized (EV-DO) of the Revision F (Rev. F), in the M2M communication, the capability information of the mobile devices can be tied up with a Registration Message (RGM), an Origination Message (ORM) or a Response Message (PRM) and transmitted to the base station by General Extension Message (GEM). However, in the current standard, the standard only defines that the capability information of the mobile devices can be tied up with other message and transmitted to the base station. Therefore, even if the base station has obtained the capability information of the mobile devices, when the Registration Message, Origination Message or Response Message is transmitted to the base station, the capability information of the mobile devices still will be tied up with them and transmitted to the base station, wasting network resources.

BRIEF SUMMARY OF THE INVENTION

A control system and method for cache coherency are provided to overcome the aforementioned problems.

An embodiment of the invention provides an information transmission method. The information transmission method is applied to the mobile device in M2M communication and includes the steps of determining whether a base station and the mobile device support transmission of capability information of the mobile device by a General Extension Message and determining whether the mobile device has transmitted the capability information to the base station when the base station and the mobile device support transmission of the capability information by the General Extension Message, wherein when the mobile device has transmitted the capability information to the base station, the capability information is not transmitted by the General Extension Message again.

An embodiment of the invention provides a mobile device. The mobile device is applied to M2M communication. The mobile device comprises a transmission module and a processing module. The transmission module is configured to transmit capability information to a base station. The processing module is configured to determine whether the base station and the mobile device support transmission of the capability information by a General Extension Message and to determine whether the mobile device has transmitted the capability information to the base station when the base station and the mobile device support transmission of the capability information by the General Extension Message, wherein when the mobile device has transmitted the capability information to the base station, the capability information is not transmitted by the General Extension Message again.

Other aspects and features of the invention will become apparent to those with ordinary skill in the art upon review of the following descriptions of specific embodiments of communication transmission methods and systems.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
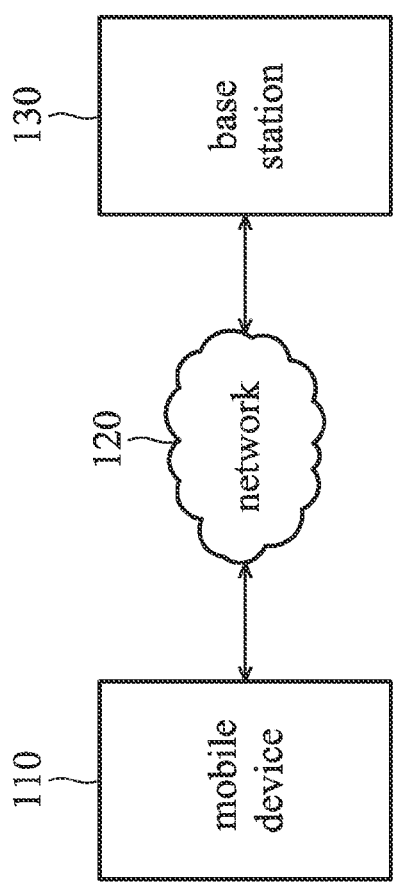
FIG. 1 is a block diagram of the communication system 100 according to an embodiment of the invention.

FIG. 1 is a block diagram of the communication system 100 according to an embodiment of the invention. The communication system comprises a mobile device 110, a network 120 and a base station 130.

The embodiments of the invention are related to the mobile device 110 and the mobile device 110 is applied to a Machine To Machine (M2M) communication. The mobile device 110 may be a user apparatus or a mobile station which is configured to establish voice call and/or provide data to the user. The mobile device 110 can connect with a computation device, such as a notebook computer, a desktop computer, or a self-contained device such as personal digital assistant (PDA). The mobile device 110 also can be called a system, a user unit, a user station, a mobile station, a remote station, an access point, a remote terminal, a user terminal, user agency or user equipment. The mobile device 110 may also be a wireless device, a mobile phone, a personal communication service (PCS) phone, a cordless phone, a session initiation protocol (SIP) phone, a wireless local loop (WLL) station, a portable device with wireless link function, or a processing device connected with a wireless modem.

In an embodiment of the invention, the network 120 can operate according to different radio access technologies, such as LTE technology, CDMA 2000 technology (e.g. radio transmission technology (RTT), 1×EV-DO Release 0/A/B/C, 1×EV-DO Release D/E/F), WiMax, wireless local area network, Universal Mobile Telecommunications System (UMTS), etc. When the network 120 is a CDMA 2000 system, the network 120 may comprise a transceiver, a controller, and a kernel network. The controller is a Base Station Controller (BSC). The kernel network comprises a Circuit Switched (CS) domain and a Packet-Switched (PS) domain. The CS domain comprises a Mobile Switching Center emulation (MSCe), a Media Gateway (MGW), a Media Resource Function Processor (MPFP), a Signaling Gateway (SGW), Service Control Point emulation (SCPe), a Home Location Register emulation (HLRe), etc. The PS domain comprises a Packet Data Service Node (PSDN) and Authentication Authorization Accounting (AAA) server.

The base station 130 can also be referred to as a fixed station, an access point, a Node B, an enhanced base station, an eNB, or some other terminology.

Figure 2:
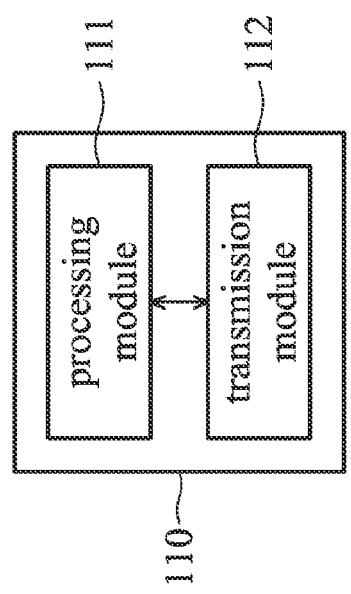
FIG. 2 is a block diagram of the mobile device 110 according to an embodiment of the invention.

FIG. 2 is a block diagram of the mobile device 110 according to an embodiment of the invention. As shown in FIG. 2, the mobile device 110 comprises a processing module 111 and a transmission module 112. FIG. 2 presents a simplified block diagram in which only the elements relevant to the invention are shown. However, the invention should not be limited to what is shown in FIG. 2.

The processing module is a general-purpose processor (GPP), a Micro Control Unit (MCU), or another processing device configured to perform the program codes stored in the mobile device 110. The processing module 111 is further configured to process the baseband signals to obtain information or data transmitted by the peer communications apparatus. The processing module 111 may also comprise a plurality of hardware elements to perform baseband signal processing. The baseband signal processing may comprise analog-to-digital conversion (ADC)/digital-to-analog conversion (DAC), gain adjustment, modulation/demodulation, encoding/decoding, and so on.

The transmission module 112 may receive RF signals via the antenna and process the received RF signals to convert the received RF signals to baseband signals to be processed by the processing module 111, or receive baseband signals from the processing module 111 and convert the received baseband signals to RF signals to be transmitted to a peer communications apparatus. The transmission module 112 may comprise a plurality of hardware elements to perform radio frequency conversion. For example, the transmission module 112 may comprise a power amplifier, a mixer, or others.

In some embodiments of the invention, the mobile device 110 further comprises a memory device (not shown). The memory device may be a volatile memory, e.g. a Random Access Memory (RAM), or a non-volatile memory, e.g. a flash memory, Read-Only Memory (ROM), or hard disk, or any combination thereof.

In an embodiment of the invention, in the M2M communication, when the mobile device 110 communicates with the base station 130 through the network 120, the processing module 111 will determine whether both of the base station 130 and the mobile station 110 support transmission of capability information by a General Extension Message (GEM), wherein transmitting the capability information by the General Extension Message means that the capability information of the mobile device 110 is tied up with a Registration Message (RGM), an Origination Message (ORM) or a Response Message (PRM) and then transmitted to the base station 130 by the General Extension Message. In an embodiment of the invention, the capability information can be terminal capability information and the capability information comprises the properties and the related parameter settings of the mobile device 110.

In an embodiment of the invention, the base station 130 confirms whether the base station 130 supports transmission of capability information by a General Extension Message according to the loading status of the base station 130, and transmits a broadcast message to the mobile device 110 to inform the mobile device 110 whether the base station 130 supports transmission of capability information by a General Extension Message. When the transmission module 112 receives the broadcast message transmitted from the base station 130, the processing module 111 will determine whether the base station 130 supports transmission of capability information by the General Extension Message according to the broadcast message. In addition, the processing module 111 of the mobile device 110 also determines whether the mobile device 110 supports transmission of capability information by a General Extension Message.

When one or both of the base station 130 and mobile device 110 don't support transmission of capability information by a General Extension Message, the transmission module 112 only transmits a Registration Message (RGM) to the base station 130, i.e. the transmission module 112 will not transmit the capability information of the mobile device 110 by tying up the capability information with other messages.

In an embodiment of the invention, when the base station 130 and mobile device 110 support transmission of capability information by a General Extension Message, the processing module 111 determines whether the capability information of the mobile device 110 has been transmitted to the base station 130. When the processing module 111 determines the capability information of the mobile device 110 has been transmitted to the base station 130, i.e. the base station 130 has obtained the capability information of the mobile device 110, the transmission module 112 will not transmit the capability information of the mobile device 110 to the base station 130 by the General Extension Message. That is to say, when the mobile device 110 needs to transmit the Registration Message (RGM), the Origination Message (ORM) or the Response Message (PRM), the transmission module 112 will not tie up the capability information of the mobile device 110 with the Registration Message (RGM), the Origination Message (ORM) or the Response Message (PRM), and re-transmit the capability information of the mobile device 110 to the base station 130 by the General Extension Message. In another embodiment of the invention, if the processing module 111 determines the capability information of the mobile device 110 has been transmitted to the base station 130, when the transmission module 112 transmits the Registration Message (RGM), the transmission module 112 will still re-transmit the capability information of the mobile device 110 to the base station 130 by the General Extension Message, but when the transmission module 112 transmits the Origination Message (ORM) or the Response Message (PRM), the transmission module 112 will not re-transmit the capability information of the mobile device 110 to the base station 130 by the General Extension Message. In an embodiment of the invention, when the base station 130 has obtained the capability information of the mobile device 110, the base station 130 will transmit an ACK (acknowledgment) signal (message) to the mobile device 110 to inform the mobile device 110 that the mobile device 110 will not transmit the capability information again.

When the processing module 111 determines the capability information of the mobile device 110 has not been transmitted to the base station 130, i.e. the base station 130 has not obtained the capability information of the mobile device 110, the transmission module 112 will tie up the capability information of the mobile device 110 with the Registration Message (RGM), the Origination Message (ORM) or the Response Message (PRM), and transmit the capability information of the mobile device 110 to the base station 130 by the General Extension Message.

In an embodiment of the invention, the processing module 111 determines whether the transmission unit 112 has transmitted the capability information to the base station 130 according to a setting value of an indicator. In an embodiment of the invention, when the indicator is set to a first default value (e.g. 1 or Yes), the processing module 111 determines that the transmission unit 112 has transmitted the capability information to the base station 130. When the indicator is set to a second default value (e.g. 0 or No), the processing module 111 determines that the transmission unit 112 has transmitted the capability information to the base station 130, and after the transmission unit 112 transmits the capability information to the base station 130, the processing module 111 will change the indicator from the second default value to the first default value. In an embodiment of the invention, when the mobile device 110 is booted, the setting value of the indicator will be set to the second default value (e.g. 0 or No) previously. In an embodiment of the invention, the indicator can be a REGISTER_X field or other fields. Note that the first default value and the second default value are only utilized to illustrate the embodiments of the invention, and therefore the invention should not be limited thereto and the first default value and the second default value can also be set to other values.

Figure 3:
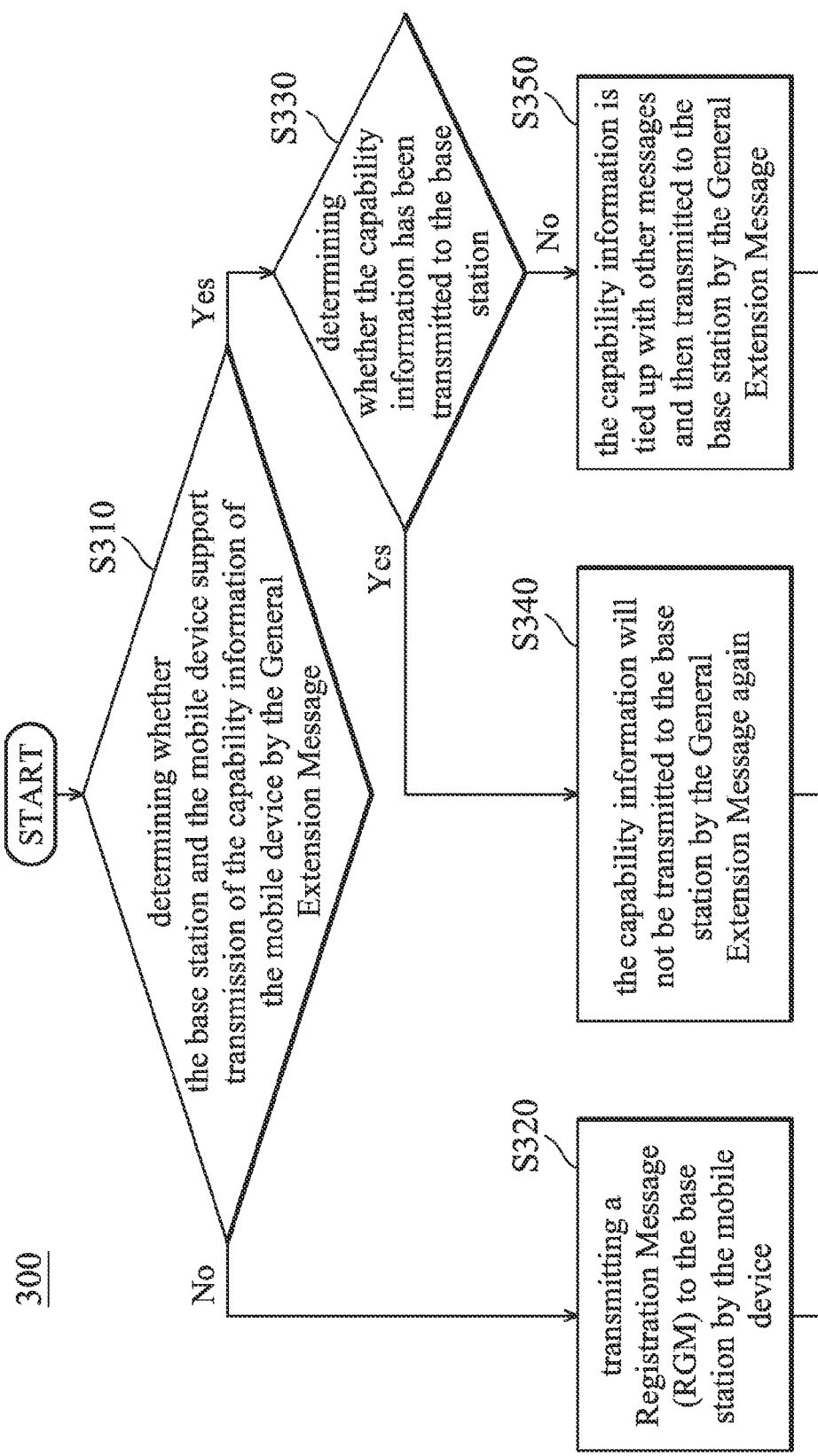
FIG. 3 is a flow chart 300 illustrating the information transmission method according to an embodiment of the invention.

FIG. 3 is a flow chart 300 illustrating the information transmission method according to an embodiment of the invention. The transmission method is applied to transmit the capability information to the base station 130 through M2M communication by the mobile device 110. As shown in FIG. 3, in step S310, the mobile device 110 determines whether the base station 130 and the mobile device 110 support transmission of the capability information of the mobile device 110 by the General Extension Message, wherein transmitting the capability information by the General Extension Message means that the capability information of the mobile device 110 is tied up with a Registration Message (RGM), an Origination Message (ORM) or a Response Message (PRM) and then transmitted to the base station 130 by the General Extension Message. When one or both of the base station 130 and the mobile device 110 can't support transmission of the capability information of the mobile device 110 by the General Extension Message, step S320 will be performed. In step S320, the mobile device 110 will transmit a Registration Message (RGM) to the base station 130, and the capability information will not transmitted with other messages by the General Extension Message.

When the base station 130 and the mobile device 110 support transmission of the capability information of the mobile device 110 by the General Extension Message, step S330 will be performed. In step S330, the mobile device 110 further determines whether the capability information has been transmitted to the base station 130. When the capability information has been transmitted to the base station 130, step S340 is performed. In step S340, the capability information will not be transmitted to the base station 130 by the General Extension Message again. That is to say, when the mobile device 110 needs to transmit the Registration Message (RGM), the Origination Message (ORM) or the Response Message (PRM), the capability information will not be tied up with these messages and re-transmitted to the base station 130 by the General Extension Message. In another embodiment of the invention, in step S340, when the mobile device 110 transmits the Registration Message (RGM), the mobile device 110 will still tie up the capability information with the Registration Message (RGM) and re-transmit the capability information to the base station 130 by the General Extension Message, but when the mobile device 110 transmits the Origination Message (ORM) or the Response Message (PRM), the mobile device 110 will not re-transmit the capability information to the base station 130 by the General Extension Message.

When the capability information has not been transmitted to the base station 130, step S350 is performed. In step S350, the capability information is tied up with other messages and then transmitted to the base station 130 by the General Extension Message.

Figure 4:
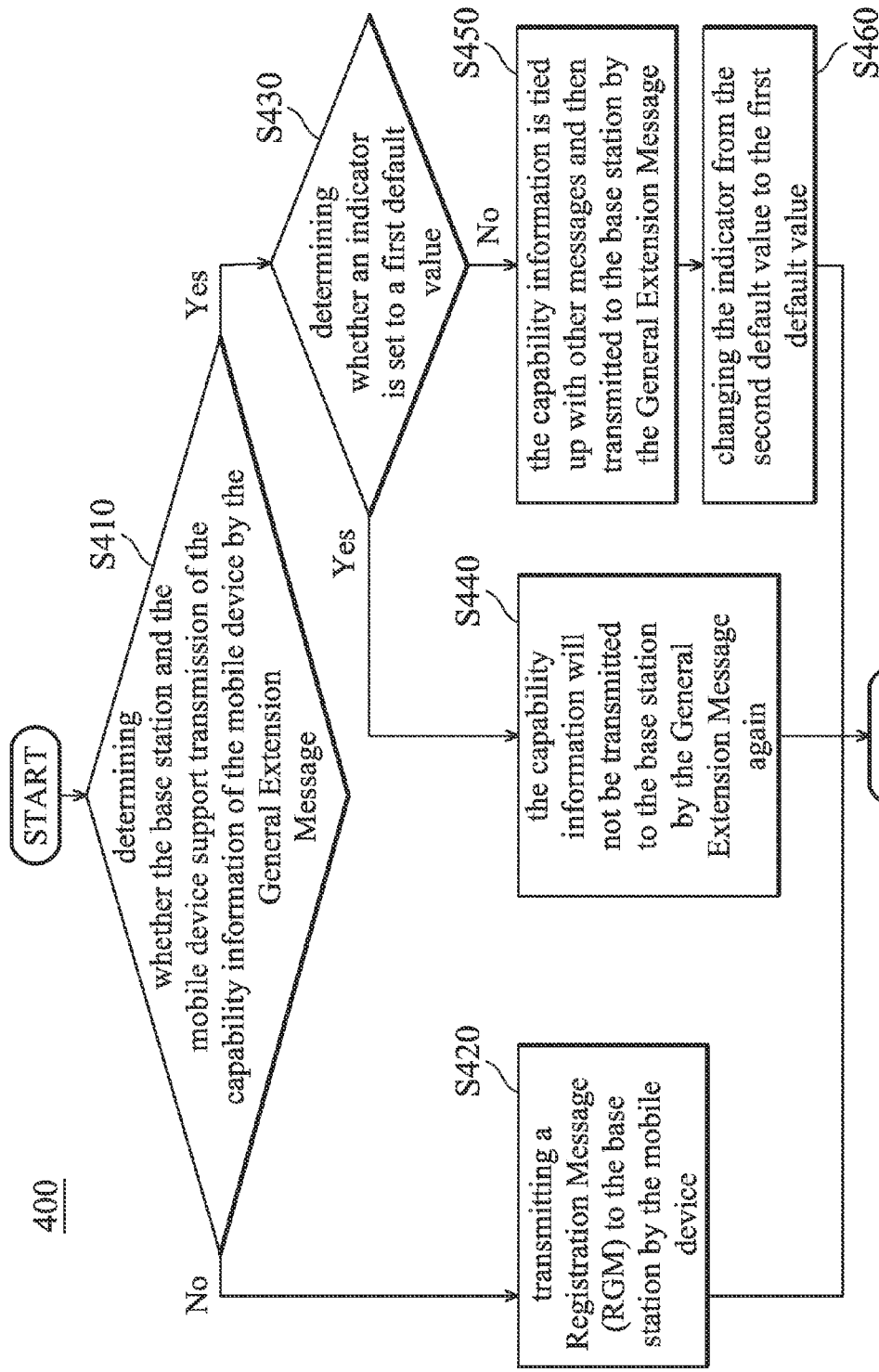
FIG. 4 is a flow chart 400 illustrating the information transmission method according to another embodiment of the invention.

FIG. 4 is a flow chart 400 illustrating the information transmission method according to another embodiment of the invention. The transmission method is applied to transmit the capability information to the base station 130 through M2M communication by the mobile device 110. As shown in FIG. 4, in step S410, the mobile device 110 determines whether the base station 130 and the mobile device 110 support transmission of the capability information of the mobile device 110 by the General Extension Message, wherein transmitting the capability information by the General Extension Message means that the capability information of the mobile device 110 is tied up with a Registration Message (RGM), an Origination Message (ORM) or a Response Message (PRM) and then transmitted to the base station 130 by the General Extension Message. When one or both of the base station 130 and the mobile device 110 can't support transmission of the capability information of the mobile device 110 by the General Extension Message, step S420 will be performed. In step S420, the mobile device 110 will transmit a Registration Message (RGM) to the base station 130, and the capability information will not transmitted with other messages by the General Extension Message.

When the base station 130 and the mobile device 110 support transmission of the capability information of the mobile device 110 by the General Extension Message, step S430 will be performed. In step S430, the mobile device 110 determines whether an indicator is set to a first default value (e.g. 1 or Yes), and whether the first default value indicates that the mobile device 110 has transmitted the capability information to the base station 130. When the mobile device 110 determines that the indicator is set to the first default value, i.e. the mobile device 110 has transmitted the capability information to the base station 130, step S440 will be performed. In step S440, the capability information will not be transmitted by the General Extension Message. That is to say when the mobile device 110 needs to transmit other messages (e.g. the Registration Message (RGM), the Origination Message (ORM) or the Response Message (PRM)) the capability information will not be tied up with other messages and re-transmitted to the base station 130 by the General Extension Message. In another embodiment of the invention, in step S440, when the mobile device 110 transmits the Registration Message (RGM), the mobile device 110 will still tie up the capability information with the Registration Message (RGM) and re-transmit the capability information to the base station 130 by the General Extension Message, but when the mobile device 110 transmits the Origination Message (ORM) or the Response Message (PRM), the mobile device 110 will not re-transmit the capability information to the base station 130 by the General Extension Message.

When the mobile device 110 determines that the indicator is not set to the first default value (set to a second default value), i.e. the mobile device 110 has not transmitted the capability information to the base station 130, step S450 will be performed. In step S450, the capability information is tied up with other messages and then transmitted to the base station 130 by the General Extension Message. In step S460, after the mobile device 110 has transmitted to the base station 130, the mobile device 110 will change the indicator from the second default value to the first default value.

In an embodiment of the invention, step S310 and step S410 further comprise: the base station 130 transmits a broadcast message to the mobile device 110. The mobile device 110 can determine whether the base station 130 supports transmission of the capability information by the General Extension Message according to the broadcast message.

For the information transmission method of the invention, the capability information of the mobile device 110 can avoid being transmitted to the base station 130 repeatedly to reduce the waste of the network resources and promote the communication efficiency.

The steps of the method described in connection with the aspects disclosed herein may be embodied directly in hardware, in a software module executed by a processor, or in a combination of the two. A software module (e.g., including executable instructions and related data) and other data may reside in a data memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. Alternatively, the processor and the storage medium may reside as discrete components in user equipment. Moreover, in some aspects any suitable computer-program product may comprise a computer-readable medium comprising codes relating to one or more of the aspects of the disclosure. In some aspects a computer program product may comprise packaging materials.

Reference throughout this specification to "one embodiment" or "an embodiment" means that a particular feature, structure, or characteristic described in connection with the embodiment is included in at least one embodiment of the invention, but does not denote that they are present in every embodiment. Thus, the appearance of the phrases "in one embodiment" or "in an embodiment" in various places throughout this specification are not necessarily referring to the same embodiment of the invention.

The above paragraphs describe many aspects of the invention. Obviously, the teaching of the invention can be accomplished by many methods, and any specific configurations or functions in the disclosed embodiments only present a representative condition. Those who are skilled in this technology will understand that all of the disclosed aspects in the invention can be applied independently or be incorporated.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. An information transmission method, applied to a mobile device in Machine-to-Machine (M2M) communication, comprising:
   determining, by a processor of the mobile device, whether a base station and the mobile device support transmission of capability information of the mobile device by a General Extension Message;
   determining, by the processor of the mobile device, whether the capability information of the mobile device has already been transmitted from the mobile device to the base station based on an indicator associated with the mobile device and indicative of whether the capability information been transmitted, and in response to the determination by the processor of the mobile device that the base station and the mobile device support the transmission of the capability information by the General Extension Message;
   in a first mode of operation, combining, by the processor of the mobile device, the capability information with a Registration Message, in response to the mobile device having determined that the capability information of the mobile device has not already been transmitted to the base station, to provide the General Extension Message that includes the capability information; and
   in an second mode of operation, omitting, by the processor of the mobile device, the combining of the capability information with the Registration Message, in response to the determination by the processor of the mobile device that the capability information of the mobile device has already been transmitted to the base station, to provide the Registration Message to the base station to omit a subsequent transmission of the capability information via the General Extension Message from the mobile device to the base station.

2. The information transmission method of claim 1, further comprising:
   transmitting, by the mobile device, the capability information to the base station by the General Extension Message in the first mode of operation; and transmitting, by the mobile device and to the base station, the Registration Message in the second mode of operation.

3. The information transmission method of claim 1, wherein combining the capability information with the Registration Message comprises:
tying up the capability information with the Registration Message to generate the General Extension Message.

4. The information transmission method of claim 1, wherein, when the indicator is set to a first value, the indicator indicates that the mobile device has already transmitted the capability information to the base station.

5. The information transmission method of claim 4, wherein, when the indicator is set to a second value, the indicator indicates that the mobile device has not yet transmitted the capability information to the base station.

6. The information transmission method of claim 5, wherein, when the mobile device has transmitted the capability information to the base station, the indicator is changed to the first value by the mobile device.

7. The information transmission method of claim 1, further comprising:
transmitting, by the base station, a broadcast message to the mobile device; and
determining, by the mobile device, whether the base station supports transmission of the capability information by the a General Extension Message based on the broadcast message.

8. A mobile device operable to use Machine-to-Machine (M2M) communication, comprising:
a transceiver configured to transmit capability information of the mobile device to a base station; and
a processor configured to:
determine whether the base station and the mobile device support transmission of the capability information by a General Extension Message;
determine whether the capability information of the mobile device has already been transmitted from the mobile device to the base station based on an indicator associated with the mobile device and indicative of whether the capability information been transmitted, and in response to the mobile device determining that the base station and the mobile device support the transmission of the capability information by the General Extension Message;
in a first mode of operation, combine the capability information with a Registration Message, in response to the mobile device having determined that the capability information of the mobile device has not already been transmitted to the base station, to provide the General Extension Message that includes the capability information; and
in an second mode of operation, omit the combining of the capability information with the Registration Message, in response to the processor having determined that the capability information of the mobile device has already been transmitted to the base station, to provide the Registration Message to the base station to omit a subsequent transmission of the capability information via the General Extension Message from the mobile device to the base station.

9. The mobile device of claim 8, wherein the transceiver is further configured to;
transmit the capability information to the base station by the General Extension Message in the first mode of operation; and
transmit the Registration Message in the second mode of operation.

10. The mobile device of claim 8, wherein combining the capability information with the Registration Message comprises:
tying up the capability information with the Registration Message to generate the General Extension Message.

11. The mobile device of claim 8, wherein, when the indicator is set to a first value, the indicator indicates that the transceiver has already transmitted the capability information to the base station.

12. The mobile device of claim 11, wherein, when the indicator is set to a second value, the indicator indicates that the transceiver has not yet transmitted the capability information to the base station.

13. The mobile device of claim 12, wherein, when the transceiver has transmitted the capability information to the base station, the processor is configured to change the indicator to the first value.

14. The mobile device of claim 8, wherein the transceiver is further configured to receive a broadcast message from the base station, and wherein the processor is configured to determine whether the base station supports transmission of the capability information by the General Extension Message based on the broadcast message.

15. The information transmission method of claim 1, further comprising:
storing, in a memory of the mobile device, information corresponding to the determination that the base station and the mobile device support the transmission of the capability information by the General Extension Message.

16. A non-transitory computer-readable medium storing processor-executable instructions used in Machine-to-Machine (M2M) communication that when executed cause a processor to:
decode a message from one or more mobile devices indicating whether a base station and the one or more mobile devices support transmission of capability information by a General Extension Message;
determine whether the capability information of the one or more mobile devices has already been transmitted from the mobile device to the base station based on an indicator associated with the mobile device and indicative of whether the capability information been transmitted, and in response to the determination that the base station and the one or more mobile devices support the transmission of the capability information by the General Extension Message;
in a first mode of operation, encode a message for transmission to the one or more mobile devices that includes the capability information combined with a Registration Message, in response to the determination that the capability information of the mobile device has not already been transmitted to the base station, to generate the General Extension Message that includes the capability information; and
in an second mode of operation, encode a message for transmission to the one or more mobile devices that includes the Registration Message and omits the capability information, in response to the determination that the capability information has already been transmitted, to generate the encoded message to omit a subsequent transmission of the capability information via the General Extension Message to the base station.

* * * * *